(12) United States Patent
Akita et al.

(10) Patent No.: US 9,260,143 B2
(45) Date of Patent: Feb. 16, 2016

(54) ROTATION DEVICE FOR CONSTRUCTION MACHINE

(75) Inventors: Hideki Akita, Tsuchiura (JP); Shigeyuki Sakurai, Tsukuba (JP); Yuuji Igawa, Omitama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 266 days.

(21) Appl. No.: 13/979,198

(22) PCT Filed: Apr. 28, 2011

(86) PCT No.: PCT/JP2011/060440
§ 371 (c)(1),
(2), (4) Date: Jul. 11, 2013

(87) PCT Pub. No.: WO2012/147201
PCT Pub. Date: Nov. 1, 2012

(65) Prior Publication Data
US 2013/0285439 A1 Oct. 31, 2013

(51) Int. Cl.
*B62D 55/092* (2006.01)
*B62D 55/15* (2006.01)
*F16K 24/00* (2006.01)

(52) U.S. Cl.
CPC .............. *B62D 55/15* (2013.01); *B62D 55/092* (2013.01); *F16K 24/00* (2013.01)

(58) Field of Classification Search
CPC ....... B62D 55/092; B62D 55/14; B62D 55/15
USPC .......................................... 305/117, 119, 136
See application file for complete search history.

(56) References Cited

U.S. PATENT DOCUMENTS

| 5,813,228 A | 9/1998 | Kubota et al. |
| 8,485,289 B2 * | 7/2013 | Drum et al. .............. 180/62 |

FOREIGN PATENT DOCUMENTS

| JP | 57-205280 A | 12/1982 |
| JP | 61-169602 U | 10/1986 |
| JP | 04-353084 A | 12/1992 |
| JP | 3010441 U | 2/1995 |
| JP | 08-324323 A | 12/1996 |
| JP | 2001-080550 A | 3/2001 |
| JP | 2004-082819 A | 3/2004 |
| JP | 2006-322538 A | 11/2006 |

OTHER PUBLICATIONS

Japanese Office Action received in Japanese Application No. 2013-511854 dated May 13, 2014.

* cited by examiner

*Primary Examiner* — John Walters
*Assistant Examiner* — James Triggs
(74) *Attorney, Agent, or Firm* — Mattingly & Malur, PC

(57) ABSTRACT

A floating seal (23) is provided between a mounting bracket (12) fixed to a side frame (6) and a roller (15) rotatable with respect to this mounting bracket (12), and lubricant oil (L) collected in the roller (15) is sealed by this floating seal (23). On the other hand, an air permeable plug (31) provided with an air permeable member (34) made of a porous material of interconnected cells is provided on a lid member (17) of the roller (15), air and/or water vapor is made to flow between the inside and the outside of the roller (15) and flow of lubricant oil (L) and/or rainwater and dusts is prevented by the air permeable member (34) of the air permeable plug (31). As a result, the pressure of the inside and the pressure of the outside of the roller (15) can be made equal all the time.

5 Claims, 7 Drawing Sheets

ROTATION DEVICE FOR CONSTRUCTION MACHINE

TECHNICAL FIELD

The present invention relates to a rotation device such as a crawler belt guide roller, a drive unit, an idler wheel and the like used in a construction machine such as a hydraulic excavator, a wheel loader and the like, for example.

BACKGROUND ART

In general, a lower traveling structure of a crawler-type vehicle such as a hydraulic excavator is substantially composed of a truck frame having left and right side frames, a drive unit provided on one end side of each of the side frames, an idler wheel (idler) provided on the other end side, a crawler belt set on a drive wheel (sprocket) and the idler wheel of the drive unit, and upper and lower crawler belt guide rollers which guide the crawler belt toward the drive wheel and the idler wheel, respectively. The above-described drive unit, idler wheel, crawler belt guide rollers and the like constitute a rotation device for a construction machine.

The crawler belt guide roller is substantially composed of a shaft support member (fixed body) provided on the side frame in a fixed manner and having a bottomed seal accommodating portion formed, a support shaft fixed to this shaft support member, a roller (rotating body) rotatably supported by the support shaft through a bush (slide bearing) and having a bottomed seal accommodating portion formed opposing the seal accommodating portion of the shaft support member with a gap between them and lubricant oil collected inside, and a floating seal arranged in the seal accommodating portion of the shaft support member and the seal accommodating portion of the roller and blocking the gap between the both.

In this case, the floating seal is composed of a pair of cylindrical seal rings, each having a sealing surface in sliding contact with each other, and a pair of O-rings held between one of the seal rings and the seal accommodating portion of the shaft support member and between the other seal ring and the seal accommodating portion of the roller, respectively. The floating seal presses each of the seal rings by an elastic force of the O-rings all the time so as to bring the sealing surfaces into sliding contact with each other in a liquid-tight manner when the roller is rotated with respect to the shaft support member and seals the lubricant oil supplied to the bearing which supports the roller and the like inside the roller (Japanese Patent Laid-Open No. 2001-80550 A).

SUMMARY OF THE INVENTION

Incidentally, if the roller is rotated while the hydraulic excavator is traveling, the bush provided between the support shaft and the roller slides with respect to the support shaft, by which friction heat is generated, and the friction heat heats the lubricant oil collected within the roller. In this case, since the inside of the roller is sealed by the floating seal so that the lubricant oil does not leak to the outside, air in the roller is heated and expanded in volume together with the lubricant oil, and the pressure inside the roller is increased.

Thus, the pressure becomes uneven between the inside of the roller and the outside of the roller partitioned by the floating seal, and if the air inside the roller leaks to the outside through the sliding contact surface between the sealing surface of one of the seal rings and the sealing surface of the other seal ring, a part of lubricant oil collected in the roller leaks to the outside of the roller along with the air.

On the other hand, when the hydraulic excavator is stopped, the rotation of the roller is stopped and friction heat is no longer generated due to sliding between the bush and the support shaft, the lubricant oil and the air in the roller are cooled. As a result, the volume of the air having been expanded in the roller is decreased, and the inside of the roller tends to have a negative pressure.

In this case, too, the pressure becomes uneven between the inside and the outside of the roller, and the outside air of the roller (outside air) flows into the roller through the sliding contact surface between the sealing surface of one of the seal rings and the sealing surface of the other seal ring. At this time, rainwater or mud water in the mud and foreign substances such as dusts floating around the roller intrude into the roller together with the outside air or adhere to the sealing surface of each seal ring.

As described above, if a balance of pressures between the inside and the outside of the roller partitioned by the floating seal is lost, the air begins to flow through the sealing surface of each seal ring, and sealing performance of the floating seal is temporarily lost. As a result, problems arise that the lubricant oil collected inside the roller leaks to the outside and rainwater and foreign substances such as dusts adhere to the sealing surface of the floating seal and quickens deterioration of the sealing performance.

In view of the above-described problems of the conventional art, it is an object of the present invention to provide a rotation device for a construction machine which can favorably maintain the sealing performance of the floating seal for a long time by keeping a good balance of pressures between the inside and the outside of the rotating body.

(1) In order to solve the above-described problems, the present invention is applied to a rotation device for a construction machine, comprising a fixed body provided by being fixed to a vehicle body of the construction machine; a rotating body provided rotatably with respect to the fixed body and having lubricant oil collected therein; and a floating seal which blocks a gap between the fixed body and the rotating body, seals the lubricant oil collected inside of the rotating body and prevents intrusion of rainwater and dusts from the outside.

A feature of the configuration employed by the present invention is that an air permeable plug which allows flow of air and/or water vapor between the inside and the outside of the rotating body and prevents flow of the lubricant oil and/or rainwater and dusts is provided on the rotating body.

With this arrangement, the air and water vapor (gas) can flow between the inside and the outside of the rotating body by means of the air permeable plug provided on the rotating body, and flow of the foreign substances (solids) such as dusts, lubricant oil or rainwater (liquid) can be prevented. Thus, even if the lubricant oil collected inside the rotating body is heated by friction heat generated during rotation of the rotating body or the like and the volume of the air in the rotating body is expanded, the expanded air can be emitted to the outside of the rotating body through the air permeable plug, and a good balance of pressures can be kept between the inside and the outside of the rotating body. Therefore, the expanded air in the rotating body is prevented from flowing out of the rotating body through the sealing surface of the floating seal, and leakage of the lubricant oil together with the air out of the rotating body is also prevented.

On the other hand, when the inside of the rotating body tends to have a negative pressure as the heated lubricant oil is cooled and the volume of the air in the rotating body is decreased, the air outside the rotating body (outside air) can be made to flow into the rotating body through the air permeable plug, and the good balance of pressures between the inside and the outside of the rotating body can be kept. Thus, inflow of the outside air into the rotating body through the sealing surface of the floating seal can be suppressed, and intrusion of the foreign substances such as dusts and water such as rainwater together with the outside air into the rotating body or adhesion thereof to the sealing surface of the floating seal can be prevented.

As described above, the pressure inside and the pressure outside of the rotating body can be made equal all the time by means of communication of the air between the inside and the outside of the rotating body through the air permeable plug. As a result, the sealing performance of the floating seal can be kept favorable, and the rotating body can be rotated smoothly for a long time by means of the lubricant oil collected inside the rotating body.

(2) According to the present invention, the air permeable plug is composed of a plug body detachably attached to the rotating body and has a communicating hole which makes the inside and the outside of the rotating body communicate with each other and an air permeable member which is disposed in the communicating hole of the plug body and allows flow of air and/or water vapor and prevents flow of lubricant oil and/or rainwater and dusts.

With this arrangement, the air and water vapor can be made to flow between the inside and the outside of the rotating body through the air permeable member only by disposing the air permeable member in the communicating hole provided in the plug body and by mounting this plug body on the rotating body. As a result, an appropriate pressure balance can be kept between the inside and the outside of the rotating body all the time, and the sealing performance of the floating seal can be kept favorable.

(3) According to the present invention, the air permeable member is formed by using a porous material of interconnected cells. Therefore, a gas such as water vapor and air can be made to flow while flow of a liquid such as lubricant oil or rainwater and a solid such as dusts are prevented in accordance with the size of small diameter passages of the porous material. As a result, a pressure difference between the inside and the outside of the rotating body is suppressed, and leakage of the lubricant oil caused by this pressure difference and intrusion of the foreign substances into the sealing surface of the floating seal can be reliably prevented.

(4) According to the present invention, the air permeable member is formed by using a porous material of interconnected cells made of any one of materials, that is, tetrafluoroethylene resin, polyimide resin, and a ceramic material.

A gas such as water vapor and air can be made to flow while the flow of a liquid such as the lubricant oil and rainwater and a solid such as dusts are prevented by forming the air permeable member by using such a material, and a pressure difference between the inside and the outside of the rotating body can be suppressed.

(5) According to the present invention, a hole diameter of each of small diameter passages constituting the air permeable member is set within a range of 0.1 µm or more and 10 µm or less. As a result, only a gas can be made to flow through the air permeable member while the flow of a liquid and a solid is prevented by the air permeable member.

(6) Moreover, according to the present invention, a hole diameter of each of small diameter passages constituting the air permeable member is set within a range of 0.15 µm or more and 0.3 µm or less. As a result, only a gas can be made to flow through the air permeable member smoothly while the flow of a liquid and a solid is reliably prevented by the air permeable member.

MODE FOR CARRYING OUT THE INVENTION

Figure 1:
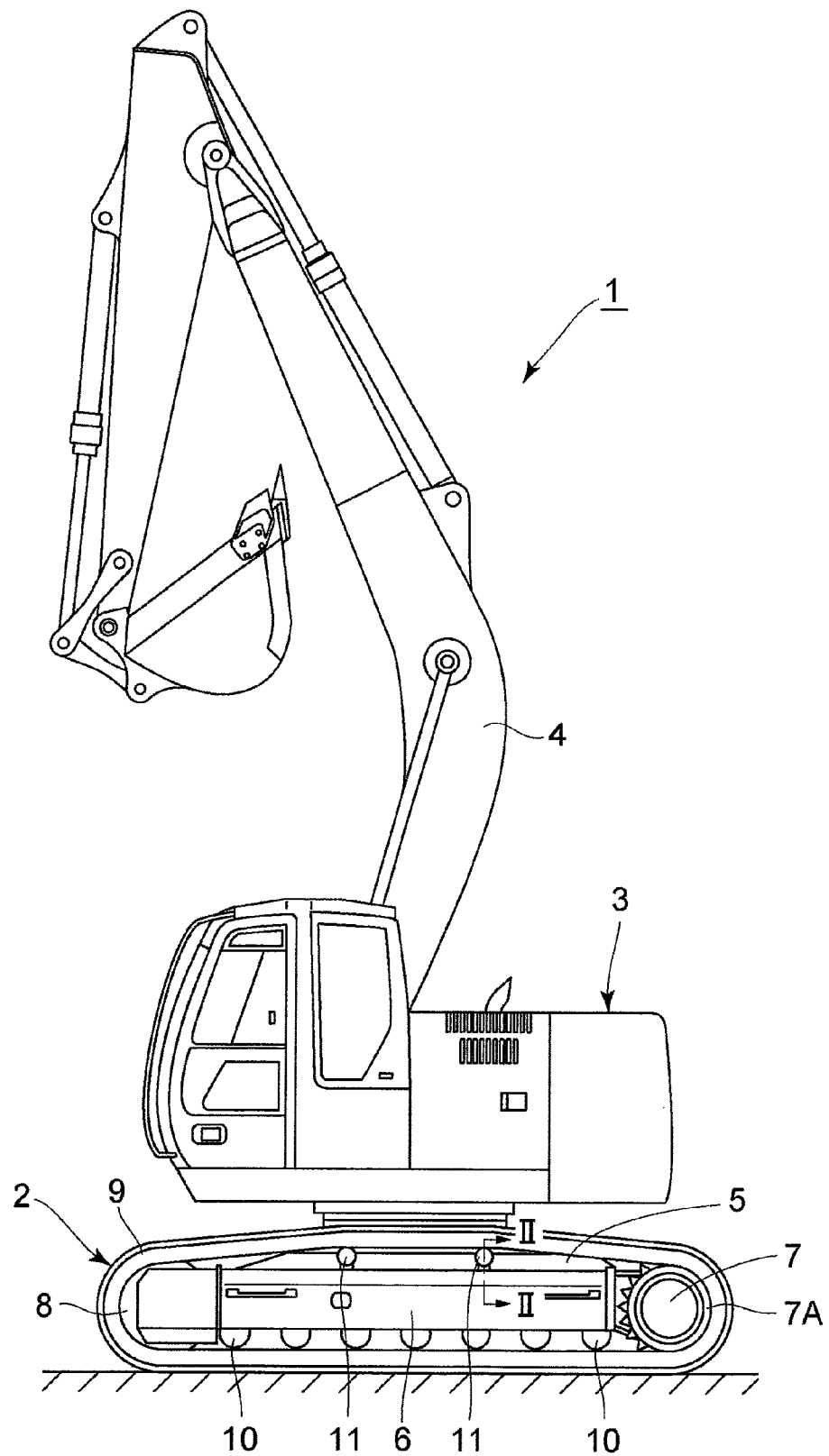
FIG. 1 is a front view of a hydraulic excavator provided with an upper crawler belt guide roller as a rotation device according to the present invention.

Embodiments of a rotation device for a construction machine according to the present invention will be described below in detail by using a case applied to a rotation device mounted on a hydraulic excavator as an example with reference to the accompanying drawings.

FIGS. 1 to 5 illustrate a first embodiment of the present invention, and an upper crawler belt guide roller of the hydraulic excavator is exemplified as a rotation device in this embodiment.

In the figure, designated at 1 is a hydraulic excavator as a typical example of a construction machine, and a vehicle body of the hydraulic excavator 1 is substantially composed of a crawler-type automotive lower traveling structure 2 and an upper revolving structure 3 mounted on the lower traveling structure 2 capable of revolving. A working mechanism 4 is liftably mounted on the front side of the upper revolving structure 3, and an excavating work or the like is performed by using this working mechanism 4.

Indicated at 5 is a truck frame constituting the lower traveling structure 2, and the truck frame 5 has left and right side frames 6 extended in the front-and-rear direction (only the left side is shown). A drive unit 7 is provided on one end side of the side frame 6 in the length direction, and an idler wheel 8 is provided on the other end side of the side frame 6 in the length direction.

Indicated at 9 is a crawler belt set between a drive wheel 7A of the drive unit 7 and the idler wheel 8, and when the crawler belt 9 is driven by the drive wheel 7A, the crawler belt 9 rotates between the drive wheel 7A and the idler wheel 8 while being guided by each of lower crawler belt guide rollers 10 and each of upper crawler belt guide rollers 11, which will be described later, and makes the lower traveling structure 2 travel.

Indicated at 10 are a plurality of lower crawler belt guide rollers rotatably provided on the lower end side of the side frame 6, and the lower crawler belt guide rollers 10 are arranged with appropriate intervals in the length direction (front-and-rear direction) of the side frame 6. Each of the lower crawler belt guide rollers 10 guides a rotating crawler belt 9 toward the drive wheel 7A and the idler wheel 8.

Subsequently, the upper crawler belt guide roller as the rotation device according to the first embodiment will be described.

Designated at 11 are two upper crawler belt guide rollers rotatably provided on the upper end side of the side frame 6, and each of the upper crawler belt guide rollers 11 guides the crawler belt 9 toward the drive wheel 7A of the drive unit 7 and the idler wheel 8 by supporting the crawler belt 9 from the lower side. Here, the upper crawler belt guide roller 11 is composed of a mounting bracket 12, a support shaft 14, a roller 15, a floating seal 23, an air permeable plug 31 and the like, which will be described later.

Designated at 12 is the mounting bracket as a fixed body provided on the upper face of the side frame 6, and the support shaft 14, which will be described later, is mounted on this mounting bracket 12. The mounting bracket 12 is composed of a mounting base plate 12A fastened by using a bolt 13 on a mounting seat 6A welded on the upper face of the side frame 6 and a cylindrical portion 12B provided integrally on the mounting base plate 12A and protruding in the left-right direction from the upper face of the side frame 6. The inner peripheral side of the cylindrical portion 12B is a shaft fitting hole 12C into which the support shaft 14 is inserted and fitted. On the other hand, a seal mounting hole 12D having a hole diameter larger than the shaft fitting hole 12C is formed at a protruding end portion of the cylindrical portion 12B in a state opened to the outside and concentrically with the shaft fitting hole 12C. This seal mounting hole 12D is configured such that the floating seal 23, which will be described later, is attached thereto.

Indicated at 14 is the support shaft fixed to the side frame 6 through the mounting bracket 12, and the support shaft 14 supports the roller 15, which will be described later, rotatably with respect to the side frame 6. The support shaft 14 has one end side (base end side) in the axial direction inserted and fitted into the shaft fitting hole 12C of the mounting bracket 12 in a press-fit state, while the other end side (distal end side) in the axial direction is a free end and protrudes in the left-right direction from the cylindrical portion 12B of the mounting bracket 12.

Designated at 15 is the roller as a rotating body rotatably mounted on the distal end side of the support shaft 14, and the roller 15 is substantially composed of a roller body 16 formed having a stepped cylindrical shape and a lid member 17, which will be described later. On the outer peripheral side of the roller body 16, a pair of crawler belt abutting surfaces 16A located on the both end sides in the axial direction and to which the crawler belt 9 is brought into contact and a pair of flange portions 16B extended annually over the entire periphery from each of the crawler belt abutting surfaces 16A are integrally provided.

A bush fitting hole 16C into which a bush 19, which will be described later, is inserted and fitted is provided in the inner peripheral side located at the center part in the axial direction of the roller body 16, and inner side end surfaces 16D and 16E are provided on the both end sides of the bush fitting hole 16C in the axial direction. A plurality of axial oil passages 16F, each extending in the axial direction while surrounding the bush fitting hole 16C and having a small diameter, are formed in the inner peripheral side of the roller body 16, and each of these axial oil passages 16F has the both end sides in the axial direction opened in the inner side end surfaces 16D and 16E.

Moreover, a seal mounting hole 16G having a hole diameter larger than the bush fitting hole 16C and on which the floating seal 23, which will be described later, is attached and a bracket accommodating hole 16H having a hole diameter larger than the seal mounting hole 16G and accommodating the cylindrical portion 12B of the mounting bracket 12 in a state surrounding from the outer peripheral side are provided in the inner peripheral side located on one end side in the axial direction in the roller body 16 (on the side of the mounting bracket 12). The seal mounting hole 16G and the bracket accommodating hole 16H are formed concentrically with the bush fitting hole 16C.

On the other hand, a thrust plate accommodating hole 16J having a hole diameter larger than the bush fitting hole 16C is formed concentrically with the bush fitting hole 16C in the inner peripheral side located on the other end side in the axial direction in the roller body 16. This thrust plate accommodating hole 16J is configured to be covered by the lid member 17, which will be described later, in a state accommodating a thrust plate 20, which will be described later.

Indicated at 17 is the lid member mounted on the other end side in the axial direction of the roller body 16, and the lid member 17 is composed of a cylindrical portion 17A inserted and fitted into the thrust plate accommodating hole 16J of the roller body 16 and a flange portion 17B whose diameter is enlarged over the entire periphery from the end surface on the outer side of the cylindrical portion 17A and fixed to the end surface of the roller body 16 using a bolt. This lid member 17 seals lubricant oil L in the roller 15 in collaboration with the floating seal 23, which will be described later, and a space between the outer peripheral surface of the cylindrical portion 17A and the inner peripheral surface of the thrust plate accommodating hole 16J of the roller body 16 is sealed by an O-ring 18 in a liquid tight manner. On the other hand, a plurality of radial direction oil passages 17C, each formed by cutting away the distal end portion in the radial direction, are provided at the distal end portion of the cylindrical portion 17A. Moreover, a female screw hole 17D bored through in the axial direction is provided in the center part of the flange portion 17B constituting the lid member 17, and an air permeable plug 31, which will be described later, is configured to be attached to the female screw hole 17D.

Indicated at 19 is the bush inserted and fitted in the bush fitting hole 16C of the roller body 16, and the bush 19 is composed of a cylindrical portion 19A having the outer peripheral side press-fitted into the bush fitting hole 16C and into which the support shaft 14 is slidably inserted and fitted into the inner peripheral side and a flange portion 19B whose diameter is enlarged over the entire periphery from one end portion of the cylindrical portion 19A and brought into contact with an inner side end surface 16E of the roller body 16. The flange portion 19B of the bush 19 is brought into sliding contact with the thrust plate 20, which will be described later.

Indicated at 20 is the thrust plate accommodated in the thrust plate accommodating hole 16J of the roller body 16, and the thrust plate 20 is formed into a disk shape having an outer diameter dimension substantially equal to the outer diameter dimension of the flange portion 19B constituting the bush 19 and fixed to an end face on the distal end side of the support shaft 14 by using a bolt 21. This thrust plate 20 is brought into contact with the flange portion 19B of the bush 19 and also brought into contact with the distal end portion of the cylindrical portion 17A of the lid member 17. As a result, the thrust plate 20 is configured to receive a thrust load acting on the roller 15 and to retain the roller 15 in the axial direction with respect to the support shaft 14.

Indicated at 22 is an oil reservoir chamber located between the lid member 17 of the roller 15 and the thrust plate 20 and provided on the inner peripheral side of the roller 15 (roller body 16), and the oil reservoir chamber 22 collects the lubricant oil L. The lubricant oil L collected in the oil reservoir chamber 22 is guided to the sliding surface between the support shaft 14 and the cylindrical portion 19A of the bush 19, the sliding to surface between the thrust plate 20 and the flange portion 19B of the bush 19 and the like through the radial direction oil passage 17C formed in the lid member 17 and the axial oil passage 16F formed in the roller body 16 and lubricates each of the sliding surfaces.

Subsequently, designated at 23 is the floating seal provided between the cylindrical portion 12B of the mounting bracket 12 and the roller body 16 of the roller 15. This floating seal 23 blocks a gap between the cylindrical portion 12B and the roller 15, seals the lubricant oil L collected in the oil reservoir chamber 22 in the roller 15, and suppresses intrusion of foreign substances such as mud water, dirt and the like into the roller 15.

The floating seal 23 is composed of a fixed-side seal ring 24 attached to the inner peripheral side of the seal mounting hole 12D of the cylindrical portion 12B, a rotation-side seal ring 25 attached to the inner peripheral side of the seal mounting hole 16G of the roller body 16, and a pair of O-rings 26 and 27 provided between the inner peripheral surface of the seal mounting hole 12D and the fixed-side seal ring 24 and between the inner peripheral surface of the seal mounting hole 16G and the rotation-side seal ring 25, respectively.

The fixed-side seal ring 24 and the rotation-side seal ring 25 are formed cylindrically by using cast iron or the like containing a material excellent in abrasion resistance and corrosion resistance, and annular sealing surfaces 24A and 25A are formed on the axial end surfaces of the fixed-side seal ring 24 and the rotation-side seal ring 25, respectively. On the other hand, each of the O-rings 26 and 27 is formed of a ferroelastic body such as butadiene rubber, and the fixed-side seal ring 24 and the rotation-side seal ring 25 are configured to allow the respective sealing surfaces 24A and 25A to be brought into sliding contact with each other in a state pressed in the axial direction by the elastic forces of the O-rings 26 and 27 all the time.

As a result, the floating seal 23 blocks a gap between the rotating roller 15 and the mounting bracket 12, seals the lubricant oil L collected in the oil reservoir chamber 22 in the roller 15, and prevents intrusion of rain water, dusts and the like into the roller 15. In this case, the sealing surface 24A of the fixed-side seal ring 24 and the sealing surface 25A of the rotation-side seal ring 25 are configured to be lubricated by the lubricant oil L sealed in the roller 15.

Subsequently, the air permeable plug used in the first embodiment will be described.

Figure 3:
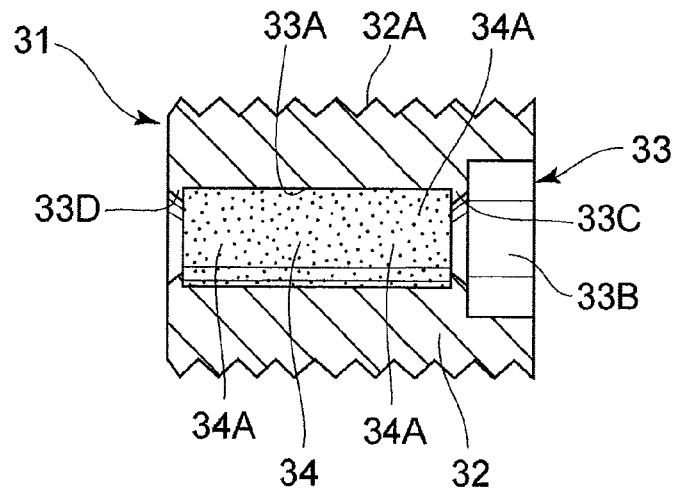
FIG. 3 is an enlarged sectional view of an essential part illustrating an air permeable plug in FIG. 2 as a single body.
Figure 4:
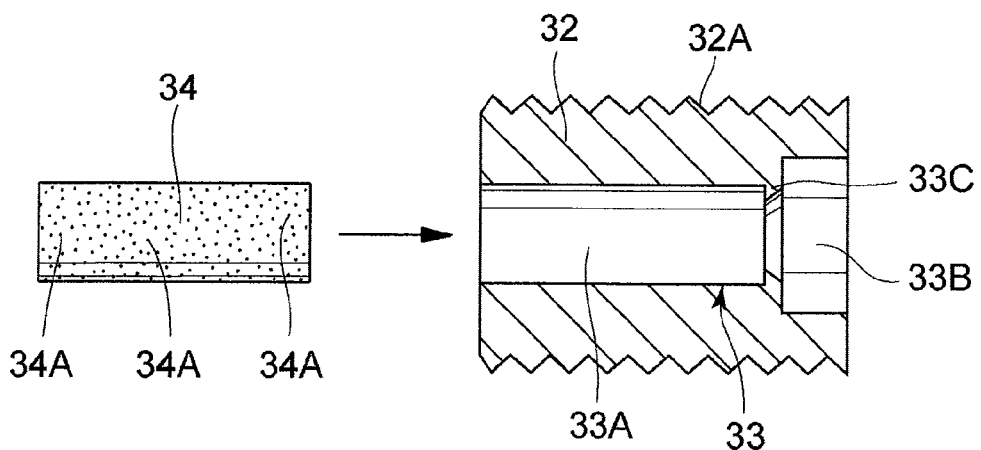
FIG. 4 is a sectional view illustrating a plug body and an air permeable member constituting the air permeable plug in a separated state.
Figure 5:
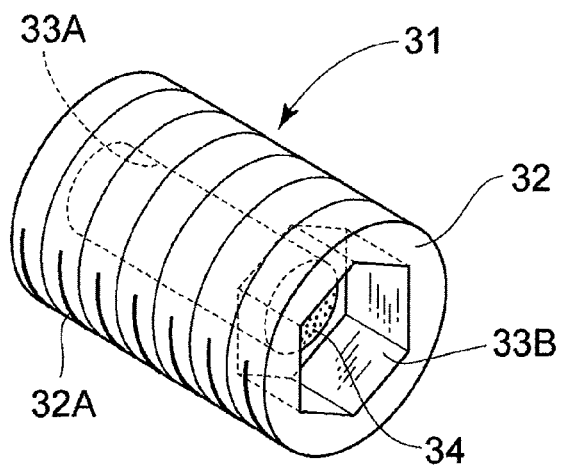
FIG. 5 is a perspective view illustrating the air permeable plug as a single body.

Designated at 31 is the air permeable plug provided on the lid member 17 of the roller 15, and the air permeable plug 31 allows flow of air and/or water vapor (gas) between the oil reservoir chamber 22 formed in the roller 15 and the outside and prevents flow of the lubricant oil and/or rainwater (liquid) and dusts (solid). The air permeable plug 31 is composed of a plug body 32 and an air permeable member 34, which will be described later, as illustrated in FIGS. 3 to 5.

Indicated at 32 is the plug body forming the outer shell of the air permeable plug 31, and the plug body 32 is generally formed having a hollow cylindrical shape. A male screw portion 32A is provided on the outer peripheral side of the plug body 32, and by screwing the male screw portion 32A with the female screw hole 17D of the lid member 17, the plug body 32 is configured to be detachably attached to the roller 15. On the other hand, a communicating hole 33, which will be described later, is formed on the inner peripheral side of the plug body 32.

Indicated at 33 is the communicating hole provided in the inner peripheral side of the plug body 32, and the communicating hole 33 is provided bored through the plug body 32 in the axial direction and allows the inside of the roller 15 to communicate with the outside in a state in which the plug body 32 is mounted on the lid member 17. The communicating hole 33 has a small diameter passage portion 33A which accommodates the air permeable member 34, which will be described later, and a hexagonal passage portion 33B having a hole diameter larger than the small diameter passage portion 33A and with which a fastening tool (not shown) such as a hexagonal wrench is engaged. One end side of the small diameter passage portion 33A is opened in the hexagonal passage portion 33B, while the other end side of the small diameter passage portion 33A is opened in the end surface in the axial direction of the plug body 32. On the other hand, one end side caulking portion 33C obtained by reducing the diameter of the small diameter passage portion 33A is formed on one end side of the small diameter passage portion 33A, while the other end side caulking portion 33D obtained by reducing the diameter of the small diameter passage portion 33A is also formed on the other end side of the small diameter passage portion 33A.

Indicated at 34 is the air permeable member disposed in the communicating hole 33 of the plug body 32, and the air permeable member 34 allows flow of the air and/or water vapor (gas) and prevents flow of the lubricant oil and/or rainwater (liquid) and dusts (solid). In this case, the air permeable member 34 is formed into a columnar shape having an outer diameter dimension substantially equal to the hole diameter of the small diameter passage portion 33A constituting the communicating hole 33 and accommodated in the small diameter passage portion 33A of the communicating hole 33.

Here, the air permeable member 34 is formed by using any one of porous materials of interconnected cells made of a large number of small diameter passages 34A, that is, tetrafluoroethylene resin (PTFE), polyimide resin, and a ceramic material, for example. Therefore, the air permeable member 34 is configured to allow only a gas such as air and water vapor to flow and prevents flow of a liquid such as the lubricant oil and rainwater and a solid such as dusts by the large number of small diameter passages 34A provided therein.

In this case, the hole diameter of the small diameter passage 34A (diameter of the small diameter passage 34A) provided in the air permeable member 34 is set as in the following formula 1. That is, if the hole diameter of the small diameter passage 34A is smaller than 0.1 μm, flow of air and/or water vapor (gas) is obstructed, while if the hole diameter of the small diameter passage 34A is larger than 10 μm, the lubricant oil and/or rainwater (liquid) and dusts (solid) goes through the air permeable member 34. Therefore, in order to allow only a gas to flow through the air permeable member 34 and to prevent flow of a liquid and a solid, the hole diameter of each of the small diameter passages 34A constituting the air permeable member 34 is set within a range in the following formula 1.

$$0.1 \text{ μm} \leq \text{hole diameter of small diameter passage } 34A \leq 10 \text{ μm} \qquad \text{[Formula 1]}$$

On the other hand, the hole diameter of the small diameter passage 34A provided in the air permeable member 34 is preferably set as in the following formula 2. That is, if the hole diameter of the small diameter passage 34A is 0.15 μm or more, a gas can be made to flow smoothly, while if the hole diameter of the small diameter passage 34A is 0.3 μm or less, flow of a liquid and a solid can be reliably prevented. Therefore, in order to allow only a gas to flow smoothly through the air permeable member 34 and to reliably prevent flow of a liquid and a solid, the hole diameter of each of the small diameter passages 34A constituting the air permeable member 34 is preferably set within the range specified by the following formula 2:

$$0.15 \text{ μm} \leq \text{hole diameter of small diameter passage } 34A \leq 0.3 \text{ μm} \quad \text{[Formula 2]}$$

A method of disposing the air permeable member 34 in the communicating hole 33 of the plug body 32 will be described. That is, as illustrated in FIG. 4, since the one end side caulking portion 33C is formed on the one end side of the small diameter passage portion 33A in advance, the air permeable member 34 is inserted into the small diameter passage portion 33A from the other end side of the small diameter passage portion 33A and then, the other end side caulking portion 33D is formed on the other end side of the small diameter passage portion 33A. As a result, the air permeable member 34 is configured to be held in a retained state in the communicating hole 33 of the plug body 32 by being locked by the one end side caulking portion 33C and the other end side caulking portion 33D.

As described above, the air permeable plug 31 in which the air permeable member 34 is disposed in the communicating hole 33 of the plug body 32 is formed, and this air permeable plug 31 is detachably attached to the lid member 17 by screwing the male screw portion 32A provided on the outer peripheral side into the female screw hole 17D provided on the lid member 17 of the roller 15. In this attachment/removal work, the air permeable plug is fastened with the lid member 17 by using a hexagonal wrench (not shown) engaged with the hexagonal passage portion 33B of the communicating hole 33. In this case, since the small diameter passage portion 33A of the communicating hole 33 has a hole diameter smaller than the hexagonal passage portion 33B, the hexagonal wrench does not touch the air permeable member 34 held in the small diameter passage portion 33A when the hexagonal wrench is engaged with the hexagonal passage portion 33B, and this air permeable member 34 can be protected.

The upper crawler belt guide roller 11 according to the first embodiment has the above-described configuration, and the crawler belt 9 rotates between the drive wheel 7A of the drive unit 7 and the idler wheel 8 when the hydraulic excavator 1 is traveling. At this time, the roller 15 of the upper crawler belt guide roller 11 guides the crawler belt 9 toward the drive wheel 7A and the idler wheel 8 by supporting the crawler belt 9 from the lower side while rotating with respect to the support shaft 14 fixed to the mounting bracket 12.

In this case, regarding the floating seal 23 provided between the seal mounting hole 12D of the mounting bracket 12 and the seal mounting hole 16G of the roller body 16, the rotation-side seal ring 25 rotates integrally with the roller 15 while the sealing surface 24A of the fixed-side seal ring 24 and the sealing surface 25A of the rotation-side seal ring 25 are in sliding contact in a liquid tight manner. Therefore, the lubricant oil L collected in the oil reservoir chamber 22 can be sealed, and since the lubricant oil L lubricates the sliding surface between the support shaft 14 and the cylindrical portion 19A of the bush 19, the sliding surface between the thrust plate 20 and the flange portion 19B of the bush 19 and the like through the radial direction oil passage 17C formed in the lid member 17 and the axial oil passage 16F formed in the roller body 16, the roller 15 can be rotated smoothly for a long time.

When the roller 15 is rotated, friction heat is generated from the sliding surface between the support shaft 14 and the cylindrical portion 19A of the bush 19 and the sliding surface between the thrust plate 20 and the flange portion 19B of the bush 19, and the lubricant oil L collected in the oil reservoir chamber 22 is heated by the friction heat. Thus, the volume of the air in the roller 15 is expanded.

At this time, since the air permeable plug 31 is mounted on the lid member 17 of the roller 15, the air (or water vapor) expanded in the roller 15 is emitted to the outside of the roller 15 through the communicating hole 33 of the air permeable plug 31. In this case, the air permeable member 34 made of a porous material of interconnected cells is disposed in the communicating hole 33, and the air permeable member 34 allows flow of a gas such as air and water vapor through the small diameter passages 34A and prevents flow of a liquid such as the lubricant oil and rainwater and a solid such as dusts. Therefore, only the air expanded in the roller 15 can be emitted to the outside of the roller 15 through the air permeable plug 31, and a pressure balance can be kept between the inside and the outside of the roller 15.

Thus, flow of the air expanded in the roller 15 to the outside through the sliding contact surface between the sealing surface 24A of the fixed-side seal ring 24 and the sealing surface 25A of the rotation-side seal ring 25 constituting the floating seal 23 can be suppressed, and leakage of the lubricant oil L together with the air to the outside of the roller 15 can be prevented. As a result, an appropriate amount of the lubricant oil L can be sealed in the roller 15 all the time, and the lubricant oil L properly lubricates the sliding surface between the support shaft 14 and the cylindrical portion 19A of the bush 19, the sliding surface between the thrust plate 20 and the flange portion 19B of the bush 19 and the like, and the roller 15 can be rotated smoothly for a long time.

On the other hand, when the hydraulic excavator 1 is stopped, for example, the lubricant oil L having been heated in the roller 15 during traveling is cooled, whereby the volume of the air in the roller 15 is decreased, and the inside of the roller 15 tends to have a negative pressure.

In this case, the air outside the roller 15 (outside air) flows into the roller 15 through the communicating hole 33 of the air permeable plug 31. In this case, the air permeable member 34 disposed in the communicating hole 33 allows the gas such as air and water vapor to flow and prevents flow of the liquid such as the lubricant oil and rainwater and the solid such as dusts, and thus, only the outside air can be made to flow into the roller 15 through the air permeable plug 31, and a pressure balance can be kept between the inside and the outside of the roller 15. Therefore, inflow of the outside air into the roller 15 through the sliding contact surface between the sealing surface 24A of the fixed-side seal ring 24 and the sealing surface 25A of the rotation-side seal ring 25 constituting the floating seal 23 can be suppressed. As a result, intrusion of a liquid such as rainwater and a solid such as dust into the roller 15 together with the outside air and adhesion thereof to the sealing surface 24A of the fixed-side seal ring 24 and the sealing surface 25A of the rotation-side seal ring 25 can be prevented, and the sealing surfaces 24A and 25A can be protected, and thus, an appropriate amount of the lubricant oil L can be sealed in the roller 15 all the time.

Thus, according to the first embodiment, the air or water vapor (gas) can be made to flow between the inside and the outside of the roller 15 by means of the air permeable plug 31 provided on the lid member 17 of the roller 15, and the flow of the foreign substances such as dusts (solid), lubricant oil and rainwater (liquid) can be prevented. Since the air and water vapor flow between the inside and the outside of the roller 15 through the air permeable plug 31, the pressure of the inside and the pressure of the outside of the roller 15 can be made equal all the time. As a result, an appropriate amount of the lubricant oil L can be sealed in the roller 15 all the time, intrusion of the rainwater or dusts into the roller 15 can be suppressed, and the sealing performance of the floating seal 23 can be kept favorable for a long time, and thus, the roller 15 can be rotated smoothly for a long time.

Figure 6:
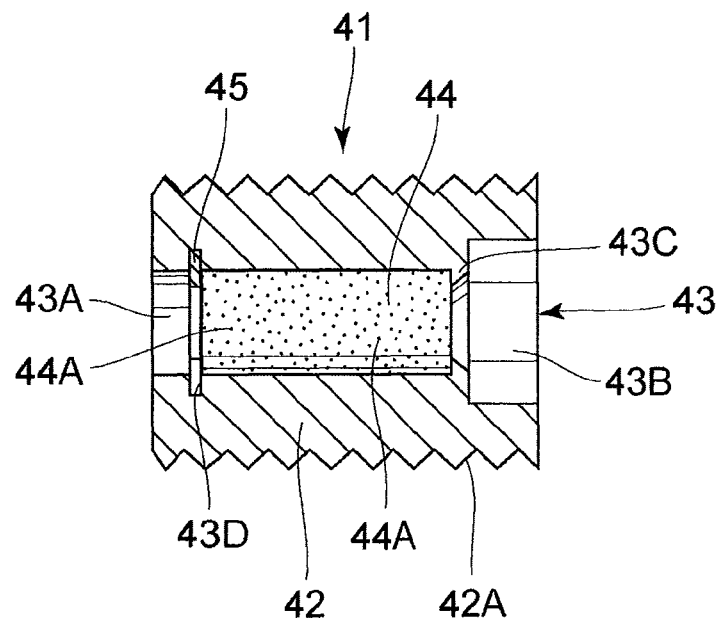
FIG. 6 is an enlarged sectional view of an essential part of an air permeable plug according to a second embodiment as a single body.
Figure 7:
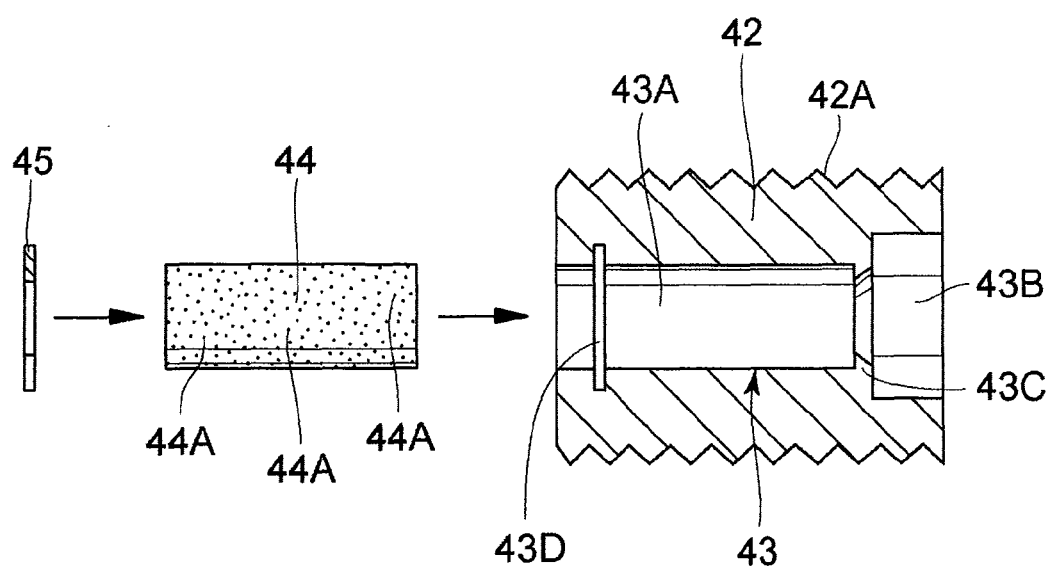
FIG. 7 is a sectional view of a plug body, an air permeable member, and a retaining ring constituting the air permeable plug in a separated state.

Next, FIGS. 6 and 7 illustrate a second embodiment of the present invention, and a feature of this embodiment is a configuration in which an air permeable member is detachably retained by using a stop ring in a communicating hole of a plug body mounted on a roller.

Figure 2:
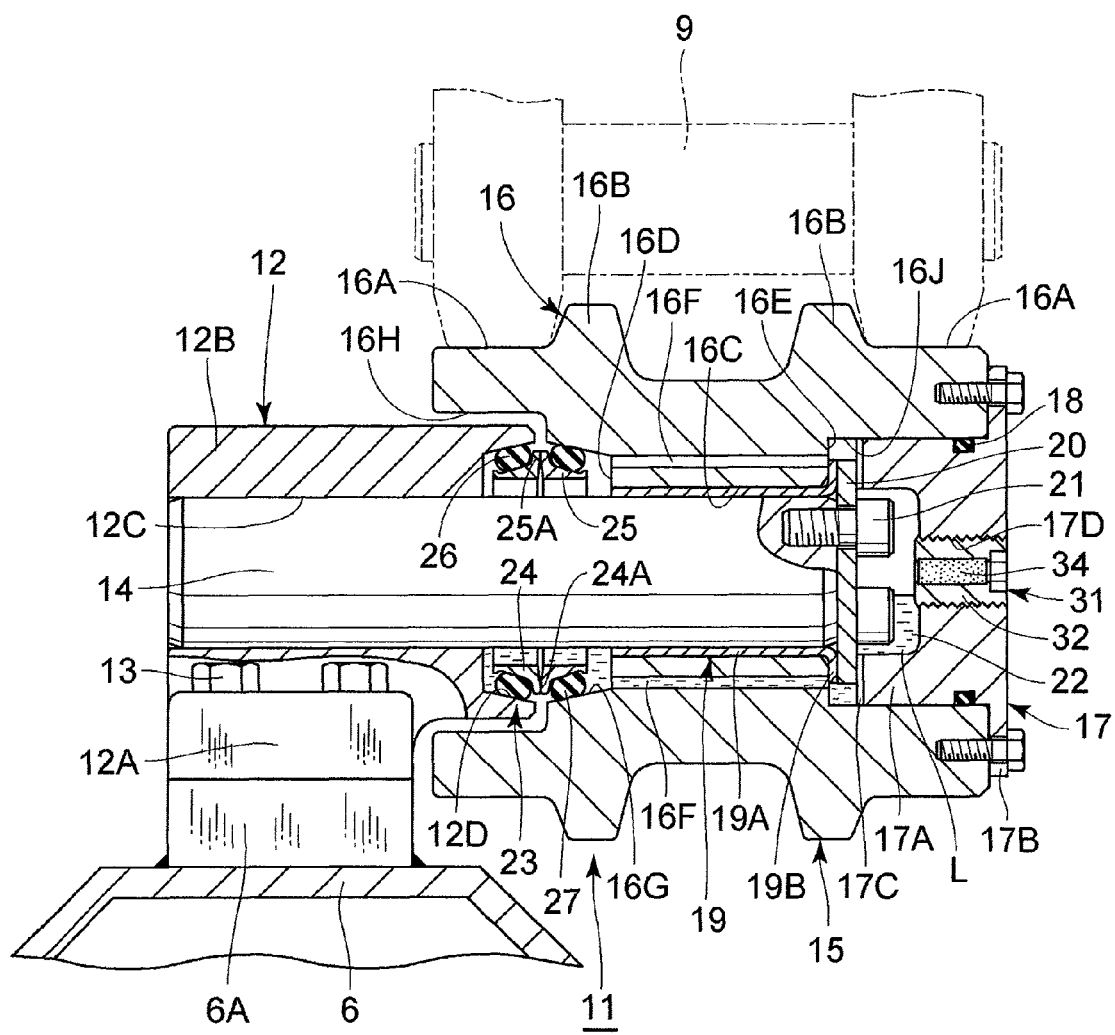
FIG. 2 is an enlarged sectional view of the upper crawler belt guide roller when seen from an arrow II-II direction in FIG. 1.

In the figures, designated at 41 is the air permeable plug used in the second embodiment, and the air permeable plug 41 is mounted on the lid member 17 of the roller 15 illustrated in FIG. 2 instead of the air permeable plug 31 according to the first embodiment. The air permeable plug 41 is composed of a plug body 42, an air permeable member 44, and a stop ring 45 for a hole, which will be described later.

Indicated at 42 is the plug body forming the outer shell of the air permeable plug 41, and the plug body 42 is generally formed having a hollow cylindrical shape, and a male screw portion 42A to be screwed into the female screw hole 17D of the lid member 17 is provided on the outer peripheral side of the plug body 42. On the other hand, a communicating hole 43, which will be described later, is formed in the inner peripheral side of the plug body 42.

Indicated at 43 is the communicating hole provided in the inner peripheral side of the plug body 42, and the communicating hole 43 is provided bored through the plug body 42 in the axial direction and makes the inside and the outside of the roller 15 communicate with each other while the plug body 42 is attached to the lid member 17. The communicating hole 43 is composed of a small diameter passage portion 43A which accommodates the air permeable member 44, which will be described later, and a hexagonal passage portion 43B having a hole diameter larger than the small diameter passage portion 43A, and one end side of the small diameter passage portion 43A is opened in the hexagonal passage portion 43B, while the other end side of the small diameter passage portion 43A is opened on the end face in the axial direction of the plug body 42.

On the other hand, a caulking portions 43C obtained by reducing the diameter of the small diameter passage portion 43A is formed on one end side of the small diameter passage portion 43A, while an entire peripheral groove 43D cut away annularly over the entire periphery of the inner peripheral surface of the small diameter passage portion 43A is formed on the other end side of the small diameter passage portion 43A, and the stop ring 45 for a hole, which will be described later, is configured to be attached to the entire peripheral groove 43D.

Indicated at 44 is the air permeable member disposed in the communicating hole 43 of the plug body 42, and the air permeable member 44 is formed into a columnar shape having an outer diameter dimension substantially equal to the hole diameter of the small diameter passage portion 43A by using a porous material of interconnected cells made of a large number of small diameter passages 44A such as tetrafluoroethylene resin (PTFE), for example, similarly to the air permeable member 34 according to the first embodiment. The air permeable member 44 allows flow only of a gas such as air and water vapor by means of the large number of small diameter passages 44A provided therein and prevents flow of a liquid such as lubricant oil and rainwater and a solid such as dust.

Indicated at 45 is the stop ring for a hole detachably attached to the entire peripheral groove 43D of the communicating hole 43, and the stop ring 45 for a hole retains the air permeable member 44 in the axial direction with respect to the communicating hole 43 by being mounted on the entire peripheral groove 43D in a state containing the air permeable member 44 in the communicating hole 43.

A method of disposing the air permeable member 44 in the communicating hole 43 of the plug body 42 will be described. That is, as illustrated in FIG. 4, since the caulking portion 43C is formed in advance on the one end side of the small diameter passage portion 43A, the air permeable member 44 is inserted into the small diameter passage portion 43A from the other end side of the small diameter passage portion 43A and then, the stop ring 45 for a hole is attached to the entire peripheral groove 43D. As a result, the air permeable member 44 can be held in the retained state in the communicating hole 43 of the plug body 42 by the caulking portion 43C of the communicating hole 43 and the stop ring 45 for a hole.

As described above, the air permeable plug 41 in which the air permeable member 44 is disposed in the communicating hole 43 of the plug body 42 is formed, and this air permeable plug 41 is configured to be detachably attached to the lid member 17 by screwing the male screw portion 42A into the female screw hole 17D provided in the lid member 17 of the roller 15 illustrated in FIG. 2 and fastened to the lid member 17 by using a hexagonal wrench (not shown) engaged with the hexagonal passage portion 43B of the communicating hole 43.

The upper crawler belt guide roller according to the second embodiment uses the air permeable plug 41 as described above and its basic action is not particularly different from that using the air permeable plug 31 according to the first embodiment.

Thus, the air permeable plug 41 used in the second embodiment holds the air permeable member 44 in the retained state in the communicating hole 43 by means of the stop ring 45 for a hole attached to the entire peripheral groove 43D of the communicating hole 43. Therefore, the air permeable member 44 in the communicating hole 43 can be replaced by removing the stop ring 45 for a hole, and air and water vapor can be reliably made to flow between the inside and the outside of the roller 15 through the air permeable plug 41. As a result, the pressure of the inside and the pressure of the outside of the roller 15 can be made equal for a long time, and the sealing performance of the floating seal 23 can be kept favorable for a long time.

Figure 8:
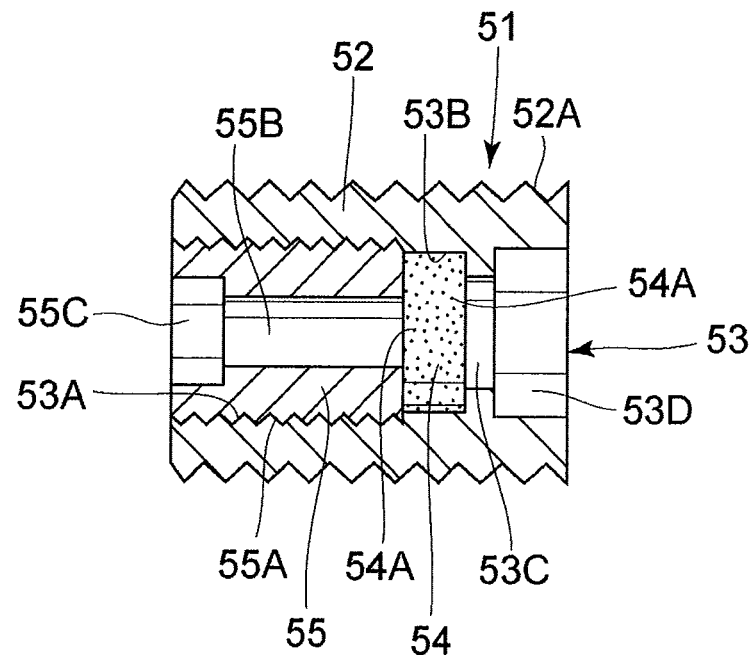
FIG. 8 is an enlarged sectional view of an essential part of an air permeable plug according to a third embodiment as a single body.
Figure 9:
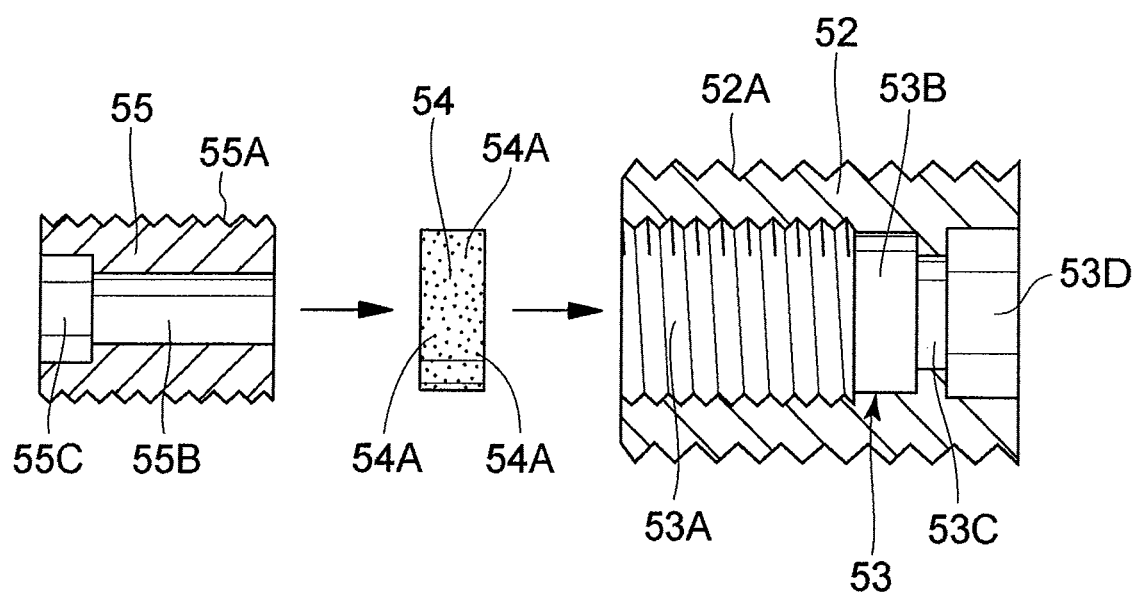
FIG. 9 is a sectional view illustrating a plug body, an air permeable member, and a retaining plug constituting the air permeable plug in a separated state.

Next, FIGS. 8 and 9 illustrate a third embodiment of the present invention, and a feature of this embodiment is a configuration in which an air permeable member is detachably held in a communicating hole of a plug body to be attached to a roller by using a retaining plug.

In the figures, designated at 51 is the air permeable plug used in the third embodiment, and the air permeable plug 51 is attached to the lid member 17 of the roller 15 illustrated in FIG. 2 instead of the air permeable plug 31 according to the first embodiment. The air permeable plug 51 is composed of a plug body 52, an air permeable member 54, and a retaining plug 55, which will be described later.

Indicated at 52 is the plug body forming the outer shell of the air permeable plug 51, and the plug body 52 is generally formed having a hollow cylindrical shape, and a male screw portion 52A screwed into the female screw hole 17D of the lid member 17 is provided on the outer peripheral side of the plug body 52. On the other hand, a communicating hole 53, which will be described later, is formed in the inner peripheral side of the plug body 52.

Indicated at 53 is the communicating hole provided in the inner peripheral side of the plug body 52, and the communicating hole 53 is provided bored through the plug body 52 in the axial direction. This communicating hole 53 is composed of a female screw portion 53A, an air permeable member accommodating portion 53B having a hole diameter slightly smaller than the female screw portion 53A and opened in the female screw portion 53A, an annular stopper portion 53C having a hole diameter smaller than the air permeable member accommodating portion 53B and opened in the air permeable member accommodating portion 53B, and a hexagonal passage portion 53D having a hole diameter larger than the annular stopper portion 53C.

Indicated at 54 is the air permeable member disposed in to the communicating hole 53 of the plug body 52, and the air permeable member 54 is formed into a disk shape having an outer diameter dimension substantially equal to the hole diameter of the air permeable member accommodating portion 53B by using a porous material of interconnected cells made of a large number of small diameter passages 54A such as tetrafluoroethylene (PTFE) resin, for example. The air permeable member 54 allows flow of only a gas such as air and water vapor and prevents flow of a liquid such as lubricant oil and rainwater and a solid such as dusts by the large number of small diameter passages 54A provided inside thereof.

Indicated at 55 is a retaining plug mounted by being screwed into the female screw portion 53A of the communicating hole 53, and the retaining plug 55 retains the air permeable member 54 in the axial direction with respect to the communicating hole 53 by holding the air permeable member 54 between the annular stopper portion 53C of the communicating hole 53 and the retaining plug 55. The retaining plug 55 is generally formed having a hollow cylindrical shape, and a male screw portion 55A screwed with the female screw portion 53A of the communicating hole 53 is provided on the outer peripheral side of the retaining plug 55. On the other hand, an air flow passage 55B bored through the retaining plug 55 in the axial direction and a hexagonal passage 55C having a hole diameter larger than the air flow passage 55B and engaged with a fastening tool such as a hexagonal wrench (not shown) are provided in the inner peripheral side of the retaining plug 55.

Therefore, when the air permeable member 54 is to be disposed in the communicating hole 53 of the plug body 52, the female screw portion 53A of the communicating hole 53 is screwed with the male screw portion 55A of the retaining plug 55 in a state in which the air permeable member 54 is contained in the air permeable member accommodating portion 53B of the communicating hole 53 and tightened by using the hexagonal wrench (not shown) engaged with the hexagonal passage 55C of this retaining plug 55. As a result, the retaining plug 55 is fixed in the communicating hole 53 of the plug body 52, and the air permeable member 54 can be held in the retained state in the communicating hole 53 of the plug body 52 by means of the annular stopper portion 53C of the communicating hole 53 and the retaining plug 55.

As described above, the air permeable plug 51 in which the air permeable member 54 is disposed in the communicating hole 53 of the plug body 52 is formed, and in this air permeable plug 51, the male screw portion 52A is screwed with the female screw hole 17D provided in the lid member 17 of the roller 15 illustrated in FIG. 2. As a result, the air permeable plug 51 is configured to be detachably attached to the lid member 17 and fastened to the lid member 17 by using the hexagonal wrench (not shown) engaged with the hexagonal passage portion 53D of the communicating hole 53.

The upper crawler belt guide roller according to the third embodiment uses the air permeable plug 51 as described above, and in the air permeable plug 51 used in this embodiment, the air permeable member 54 in the communicating hole 53 can be replaced by removing the retaining plug 55 from the communicating hole 53 of the plug body 52. As a result, air and water vapor are reliably made to flow between the inside and the outside of the roller 15 through the air permeable plug 51, and the pressure of the inside and the pressure of the outside of the roller 15 can be made equal for a long time. Therefore, the sealing performance of the floating seal 23 can be kept favorable for a long time.

Figure 10:
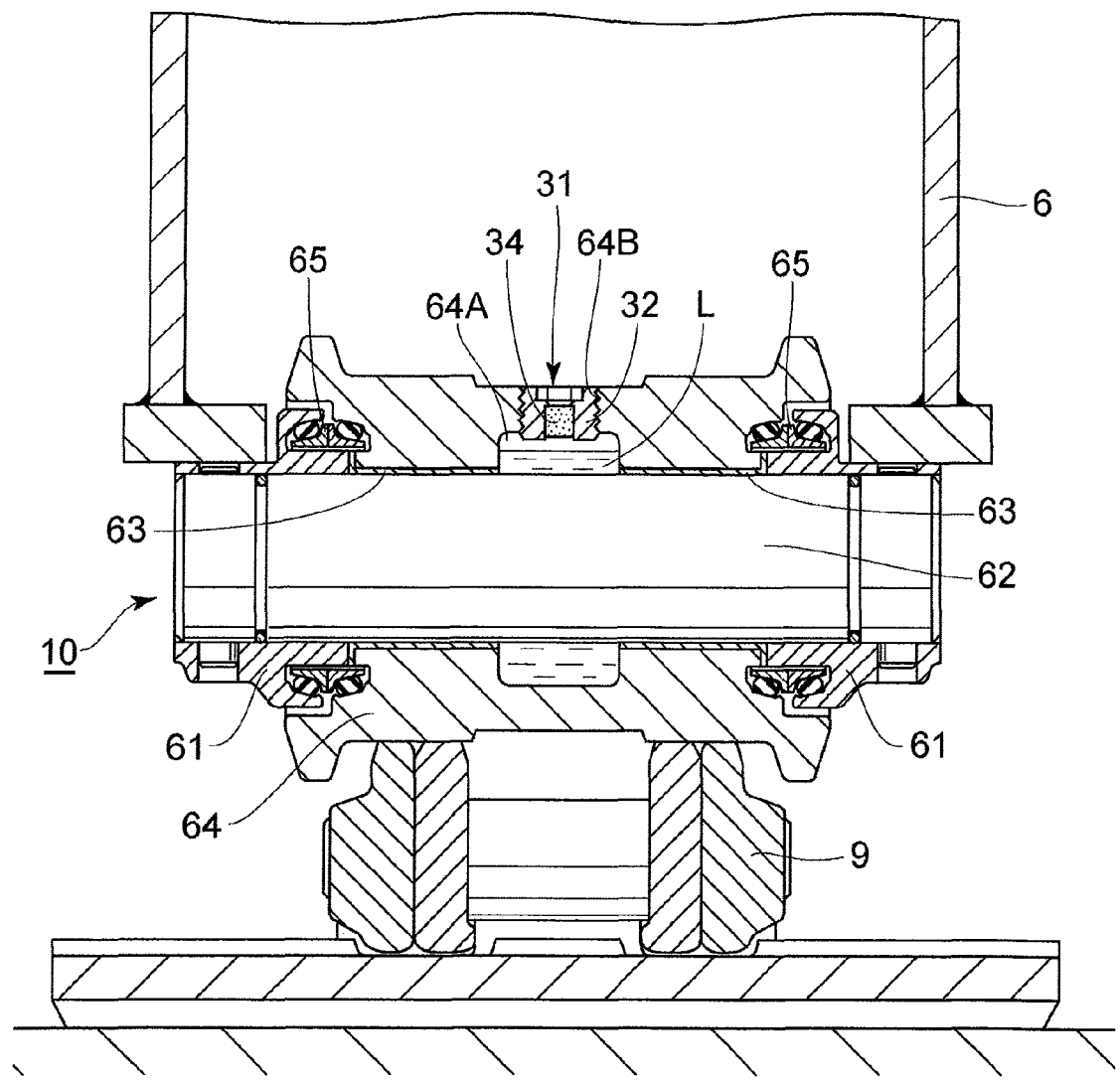
FIG. 10 is a sectional view illustrating a first modification in which the air permeable plug is applied to a lower crawler belt guide roller of a hydraulic excavator.

It should be noted that, in the above-described first embodiment, the upper crawler belt guide roller 11 is used as an example of the rotation device for a construction machine, and a case in which the air permeable plug 31 is attached to the roller 15 of this upper crawler belt guide roller 11 is exemplified. However, the rotation device for a construction machine according to the present invention may be applied to the lower crawler belt guide roller 10 as in a first modification illustrated in FIG. 10, for example.

The lower crawler belt guide roller 10 is substantially composed of left and right shaft support members 61 as fixed bodies fixed to the lower end side of the side frame 6, a roller support shaft 62 fixed between these shaft support members 61, a roller 64 as a rotating body rotatably supported by the roller support shaft 62 through a bearing 63, and left and right floating seals 65 provided respectively between each of the left and right shaft support members 61 and the roller 64. An oil reservoir chamber 64A which collects the lubricant oil L supplied to the sliding surface between the roller 64 and the bearing 63 is provided in an intermediate portion in the axial direction of the roller 64, and this lubricant oil L is configured to be sealed in the oil reservoir chamber 64A of the roller 64 by means of the floating seals 65.

In this case, a female screw hole 64B which makes the oil reservoir chamber 64A of the roller 64 communicate with the outside is provided in the intermediate portion in the axial direction of the roller 64, and the air permeable plug 31 is attached to this female screw hole 64B so that the pressure of the inside and the pressure of the outside of the roller 64 can be made equal, and the sealing performance of the floating seal 65 can be maintained favorable for a long time.

Figure 11:
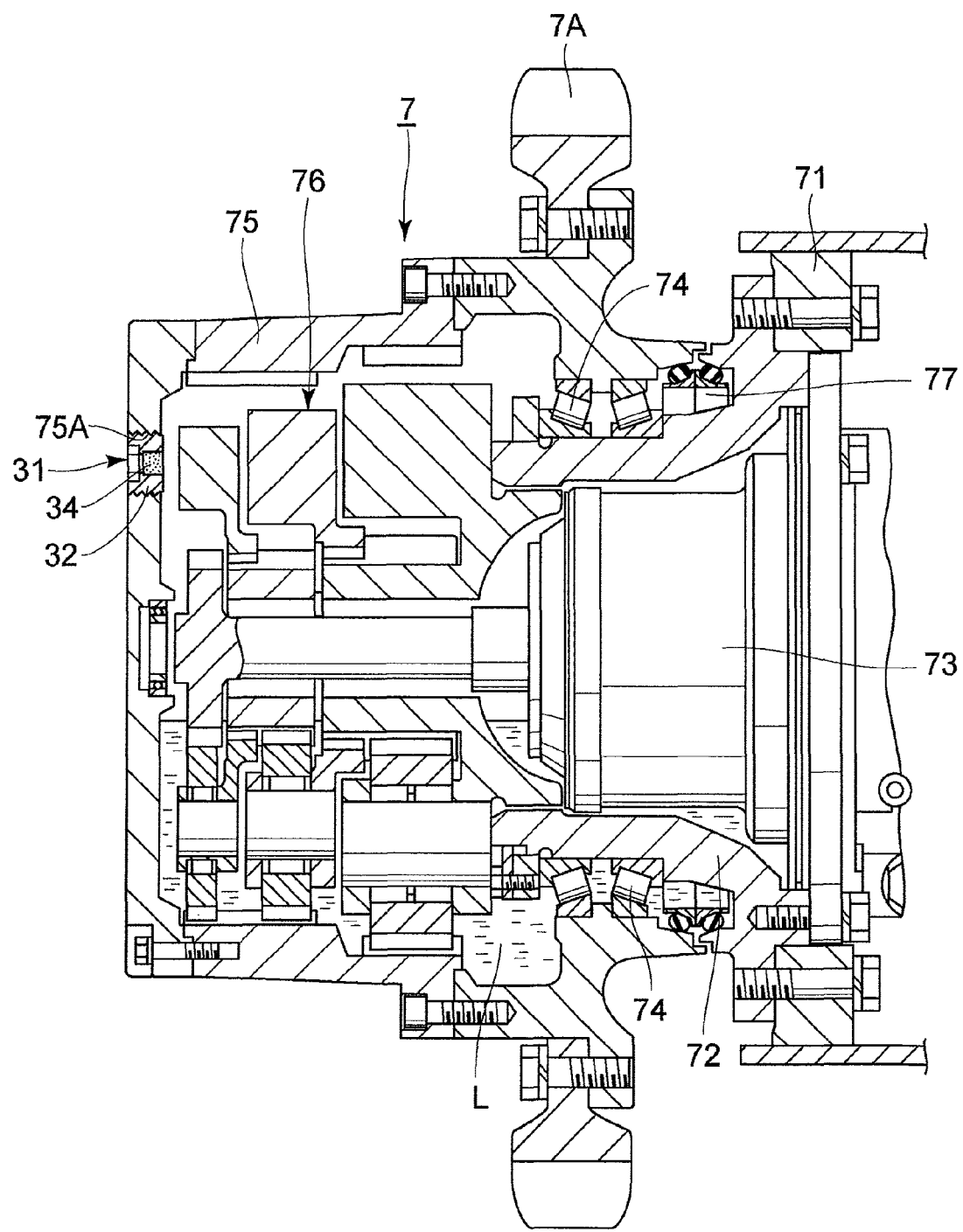
FIG. 11 is a sectional view illustrating a second modification in which the air permeable plug is applied to a drive unit of the hydraulic excavator.

Moreover, the rotation device for a construction machine according to the present invention may be applied to the drive unit 7 as in a second modification illustrated in FIG. 11, for example.

The drive unit 7 is substantially composed of a motor housing 72 as a fixed body fixed to a drive wheel bracket 71, a hydraulic motor 73 arranged in the motor housing 72 and mounted on the drive wheel bracket 71, a reduction gear housing 75 as a rotating body rotatably mounted on the outer peripheral side of the motor housing 72 through a bearing 74 and to which the drive wheel 7A is fixed, a planetary gear reduction mechanism 76 which is provided in the reduction gear housing 75 and reduces the speed of rotation of the hydraulic motor 73 and transmits it to the reduction gear housing 75, and a floating seal 77 provided between the motor housing 72 and the reduction gear housing 75. The lubricant oil L which lubricates the bearing 74, the planetary gear reduction mechanism 76 and the like is collected in the inner peripheral side of the motor housing 72 and the reduction gear housing 75, and it is configured such that the lubricant oil L is sealed by the floating seal 77 in the reduction gear housing 75.

In this case, a female screw hole 75A which makes the inside and the outside of the reduction gear housing 75 communicate with each other is provided on the axial end surface of the reduction gear housing 75, and the pressure of the inside and the pressure of the outside of the reduction gear housing 75 can be made equal by attaching the air permeable plug 31 to this female screw hole 75A, and the sealing performance of the floating seal 77 can be maintained favorable for a long time.

Moreover, according to the above-described first embodiment, the example in which the air permeable member 34 is fixed in the communicating hole 33 by holding the air permeable member 34 between the one end side caulking portion 33C provided on the communicating hole 33 of the air permeable plug 31 and the other end side caulking portion 33D is exemplified.

However, the present invention is not limited to the same, and it may be so configured that the air permeable member 34 is bonded into the communicating hole 33 by applying an adhesive between the inner peripheral surface of the small diameter passage portion 33A of the communicating hole 33 and the outer peripheral surface of the air permeable member 34, for example.

DESCRIPTION OF REFERENCE NUMERALS

1: Hydraulic excavator (Construction machine)
2: Lower traveling structure (Vehicle body)
7: Drive unit (Rotation device)
10: Lower crawler belt guide roller (Rotation device)
11: Upper crawler belt guide roller (Rotation device)
12: Mounting bracket (Fixed body)
15, 64: Roller (Rotating body)
23, 65, 77: Floating seal
31, 41, 51: Air permeable plug
32, 42, 52: Plug body
33, 43, 53: Communicating hole
34, 44, 54: Air permeable member
34A, 44A, 54A: Small diameter passage
61: Shaft support member (Fixed body)
72: Motor housing (Fixed body)
75: Reduction gear housing (Rotating body)

The invention claimed is:

1. A rotation device for a construction machine, comprising:
a fixed body which is fixed to a vehicle body of said construction machine;
a rotating body rotatably supported with respect to said fixed body and having lubricant oil collected therein; and
a floating seal which blocks a gap between said fixed body and said rotating body, which floating seal seals the lubricant oil collected in said rotating body and which prevents intrusion of rainwater and dust from the outside, characterized in that:
an air permeable plug is provided on said rotating body, said air permeable plug being composed of a plug body which is detachably attached to said rotating body and which has a communicating hole which allows the inside and the outside of said rotating body to communicate with each other, and that an air permeable member is disposed in said communication hole of said plug body and allows flow of at least one of air and water vapor and prevents flow of at least one of the lubricant oil, rainwater and dust.

2. The rotation device for a construction machine according to claim 1, wherein
said air permeable member is formed using a porous material of interconnected cells.

3. The rotation device for a construction machine according to claim 1, wherein
said air permeable member is formed using a porous material of interconnected cells made of one of tetrafluoroethylene resin, polyimide resin, and a ceramic material.

4. The rotation device for a construction machine according to claim 1, wherein
a hole diameter of each of a plurality of small diameter passages constituting said air permeable member is set within a range of 0.1 μm or more and 10 μm or less.

5. The rotation device for a construction machine according to claim 1, wherein
a hole diameter of each of a plurality of small diameter passages constituting said air permeable member is set within a range of 0.15 μm or more and 0.3 μm or less.

* * * * *